(12) United States Patent
Forman et al.

(10) Patent No.: US 7,406,452 B2
(45) Date of Patent: Jul. 29, 2008

(54) MACHINE LEARNING

(75) Inventors: George Henry Forman, Port Orchard, WA (US); Stephane Chiocchetti, Antony (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 333 days.

(21) Appl. No.: 11/083,320

(22) Filed: Mar. 17, 2005

(65) Prior Publication Data
US 2006/0224538 A1  Oct. 5, 2006

(51) Int. Cl.
G06E 1/00 (2006.01)
G06E 3/00 (2006.01)
G06F 15/18 (2006.01)
G06G 7/00 (2006.01)
G06N 3/02 (2006.01)
(52) U.S. Cl. ................................. 706/20; 706/21; 706/15
(58) Field of Classification Search .................. 706/12, 706/14, 45, 46, 47, 20, 13, 16, 50; 707/5; 382/224
See application file for complete search history.

(56) References Cited

U.S. PATENT DOCUMENTS

2004/0024653 A1* 2/2004 Edgardo et al. ............... 705/26

OTHER PUBLICATIONS

'Elements of Artificial Neural Networks': Mehrotra, 1997, MIT Press, pp. 10, 11, 20, 25, 137.*
'Elements of artificial neural networks': Mehrotra, MIT press, 1997, p. 11, 19-21, 25, 137.*
Caruana, R., "Multitask Learning", School of Computer Science, Carnegie Mellon Univ., Pittsburgh, PA, Sep. 1997.
Stefanowski, J., "Changing Representation of Learning Examples While Inducing Classifiers Based on Decision Rules", Poznan Univ. of Technology, Poland, Nov. 2003.
Thrun, S., "Learning One More Thing", School of Computer Science, Carnegie Mellon Univ., Pittsburgh, PA, Aug. 1995.

* cited by examiner

*Primary Examiner*—David Vincent
*Assistant Examiner*—Peter Coughlan

(57) ABSTRACT

A first set of classifiers are trained to predict categories using attributes of cases. A second set of a classifiers are also trained to predict the categories using the attributes of the cases. In addition, the second set of classifiers use the predictions from at least one of the classifiers in the first set to make predictions.

20 Claims, 5 Drawing Sheets

MACHINE LEARNING

TECHNICAL FIELD

The technical field relates generally to classification technology, and more specifically to machine learning.

BACKGROUND

In recent years, machine learning applications, which typically include computer applications learning from a set of examples to perform a recognition task, have becoming increasingly popular. A task typically performed by these types of machine learning applications is classification, such as automatically classifying documents under one or more topic categories. This technology is used in filtering, routing and filing information, such as news articles or web pages, into topical directories or e-mail inboxes. For example, the text documents may be represented using a fixed set of attributes, each representing the number of times a particular key word appears in the document. Using an induction algorithm, also referred to as a classifier learning algorithm, that examines the input training set, the computer 'learns' or generates a classifier, which is able to classify a new document under one or more categories. In other words, the machine learns to predict whether a text document input into the machine, usually in the form of a vector of predetermined attributes describing the text document, belongs to a category. When a classifier is trained, classifier parameters for classifying documents are determined by examining a training set of documents that have been assigned labels indicating to which category each training example belongs. After the classifier is trained, the classifier's goal is to predict to which category a case provided to the classifier for classification belongs.

Known classification techniques treat each classification task independently. However, in many practical situations the same document must be classified with respect to multiple sets of categories. For example, A(A1, A2) and B(B1,B2) represent two different classification tasks, each having a pair of categories. For example, the task A may be to classify whether cases are in a 'surfing' category (A1) or not (A2), and the task B may represent the 'Hawaii' category (B1) or not (B2).

The existing literature on machine learning mainly treats each of the classifications for the examples described above as separate and independent classification problems. This would be fine if there were ample training data for each of the categories. Unfortunately, in practice there may be many documents to learn from that are labeled for classification task A, but few for classification task B. This generally results in either poor prediction accuracy for task B, or spending additional time and resources to obtain more training data to improve the learned classifier for task B.

BRIEF DESCRIPTION OF THE DRAWINGS

Various features of the embodiments can be more fully appreciated, as the same become better understood with reference to the following detailed description of the embodiments when considered in connection with the accompanying figures.

DETAILED DESCRIPTION

For simplicity and illustrative purposes, the principles of the embodiments are described. Moreover, in the following detailed description, references are made to the accompanying figures, which illustrate specific embodiments. Changes may be made to the embodiments without departing from the spirit and scope of the embodiments.

Figure 1:
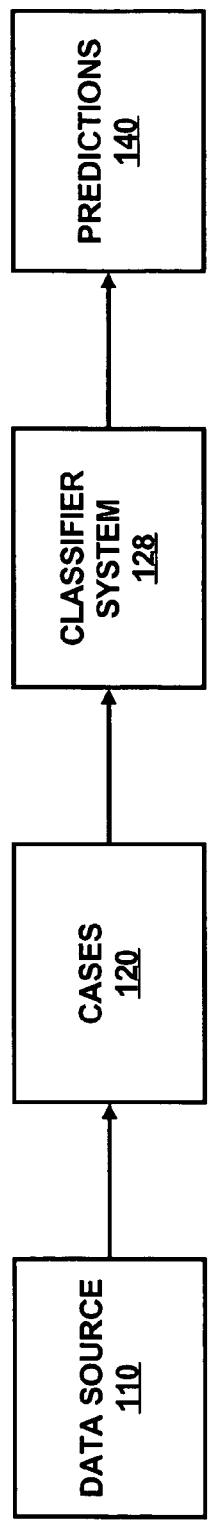
FIG. 1 illustrates a system, according to an embodiment.

FIG. 1 illustrates a system 100 that provides classification, which is used in an embodiment. The system 100 includes a data source 110 operable to provide cases 120 to a classifier system 128. The output of the classifier system 128 is predictions 140 indicating for each of the cases 120 in which predetermined categories it belongs.

The data source 110 includes a database or another type of data store operable to store the cases 120. The cases 120 include data to be classified. For example, the cases 120 include documents, payroll data, web surfing data, user profiles, and the like. The cases 120 are represented using a plurality of attributes describing each case. Each case is represented by a vector including an attribute value for each of the plurality of attributes. This vector representation is input into the classifier system 128 for classifying the cases 120. The cases 120 are a training set of objects for training classifiers in the classifier system 128 when the classifiers are trained, or the cases 120 are data to be classified after the classifiers are trained. The classifier system 128 includes a plurality of classifiers operable to classify cases into a plurality of categories.

Figure 2:
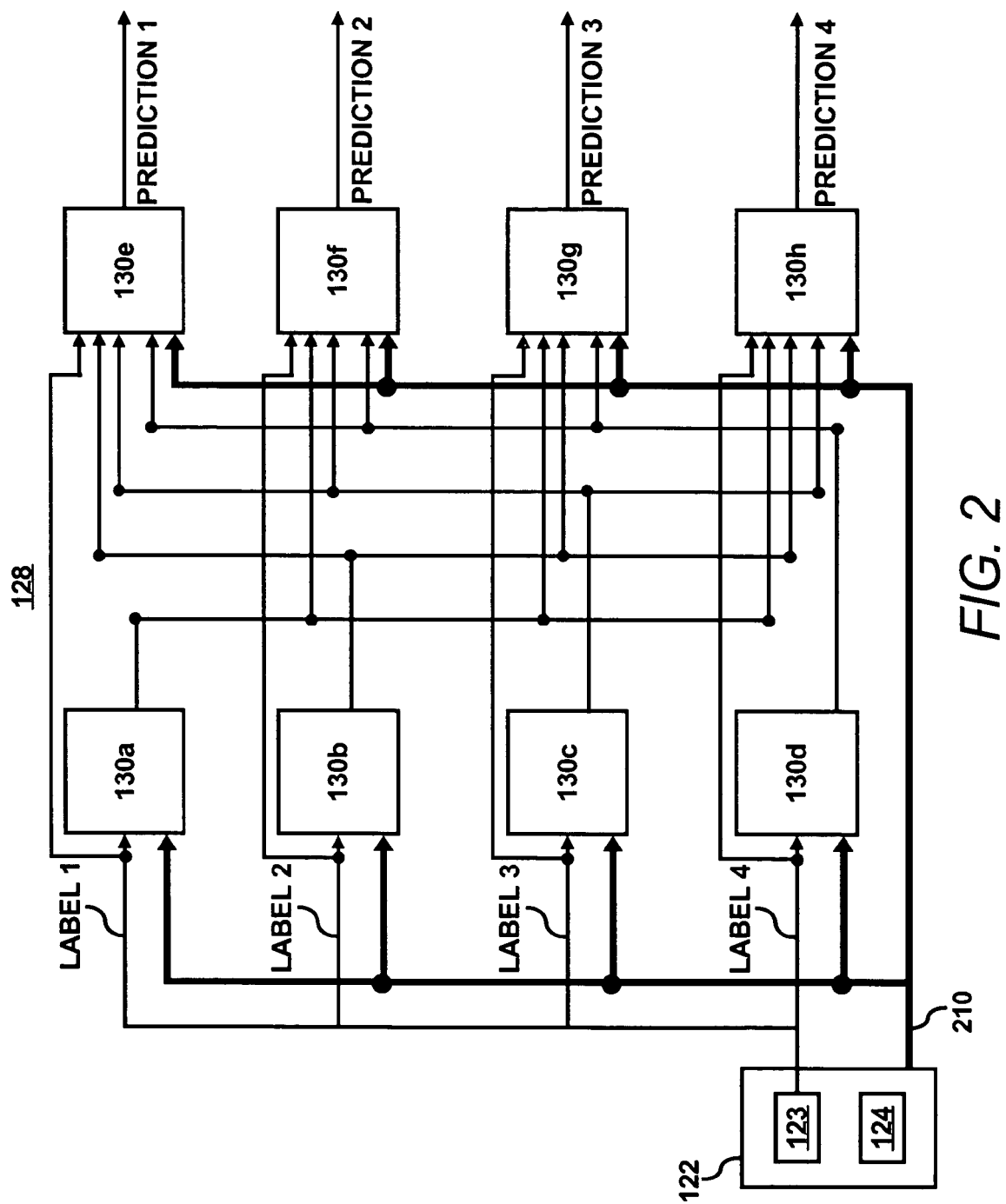
FIG. 2 illustrates a block diagram of a system of classifiers, according to an embodiment.

FIG. 2 illustrates a block diagram of the classifier system 128, according to an embodiment. The classifier system 128 includes at least two sets of classifiers, wherein both sets of classifiers receive as input the same training set. In addition, the second set receives as input the predictions from the first set of classifiers, which are leveraged by the second set of classifiers to improve prediction accuracy of the predictions, such as the predictions 140 shown in FIG. 1, generated by the second set of classifiers in FIG. 2. As shown in detail in FIG. 2, the classifiers 130a-130h are being trained using a training set 122. The input 210 illustrates the input of the training set 122 into the classifiers 130a-130h. In this example, the training set 122 includes labels 123 and cases 124 that are predetermined to be classified under the categories for the respective classifiers. The training set 122 is input into each of the classifiers 130a-h. Thus, the labels 123 and cases 124 are input into each of the classifiers 130a-h.

The label inputs 1-4 indicate whether a particular case from the training set 122 are classified under a particular category. For example, labels 1-4 are respectively the following categories for classifying documents: health, financial, sports, and soccer. In this example, the cases in the training set 122 are documents. The classifier 130a receiving a document from the training set 122 predicts whether the document is related to health. The label 1 input indicates to the classifier 130a whether the document is a health document. For example, a label in the training set 122 corresponding to a document from the training set 122 indicates that the document is a health document and thus belongs to the health category. An induction algorithm being used to train the classifier 130a adjusts parameters in the classifier 130a in order that it makes accurate predictions for the training set 122. Perfect accuracy, although typically not achieved, means the output of classifier 130a always matches the label 1 given in the training set. The classifiers 130b-130d are similarly trained.

The label inputs 1-4 are available for training the classifiers 130a-g. However, the label inputs 1-4 are typically not available after training when the classifiers are being used to output predictions. Then, the classifiers 130a-g are used to classify cases, such as the cases 120 shown in FIG. 1. Similarly to the cases 120, the training set 122 may be provided from the data source 110 or another source. Also, the classifiers 130a-g are included in the classifier system 128 shown in FIG. 1 and are operable to make the predictions 140 for the cases 120.

The classifiers 130e-130h shown in FIG. 2 are a second set of classifiers that correspond to the first set of classifiers including the classifiers 130a-130d. In particular, the classifier 130e corresponds to the classifier 130a because both classifiers are predicting for the same category, such as the health category. The classifiers 130f-130h correspond to the classifiers 130b-d respectively.

Each of the classifiers 130e-130h is trained with the same training set as the classifiers 130a-d, as shown with the input 210. However, in addition to the input 210, the classifiers 130e-130h input the predictions of non-corresponding classifiers from the first set for classifying cases and for training. For example, the classifier 130e receives the predictions from the non-corresponding classifiers 130b-130d in the first set of classifiers. The classifier 130e is trained based on the attributes of the training cases 124, the predictions from the non-corresponding classifiers 130b-130d, and the label 1 input, which, for example, indicates whether a document in the training set 122 is a health document assuming the classifiers 130a and 130e are being trained to predict whether documents are classified under the health category. The classifier 130a predicts that there is a 55% probability that a document in the training set 122 should be classified under the health category. The classifier 130b predicts that there is a 95% probability that the document should be classified under label 2, which is the financial category. The classifier 130e receives the prediction of the classifier 130b and predicts that the document should not be classified under the health category, which is label 1.

In addition to the predictions of non-corresponding classifiers, the classifiers of the second set may consider other factors when predicting an attribute. In one embodiment, a maximum score of non-corresponding classifiers in the first set may be used as an additional input attribute for the second set of classifiers or the maximum score may be determined by each of the second set of classifiers based on the predictions of respective non-corresponding classifiers. The maximum score is useful when a category is mutually exclusive with another category. For example, if labels 1-4 are usually mutually exclusive, then a document is usually only classified under exactly one of the categories corresponding to labels 1-4. For example, if the classifier 130e receives predictions of 85%, 35%, and 10% from classifiers 130b-d respectively for classifying the same document, the maximum score is 85% for the category for label 2. This maximum score is used as an additional input attribute by the classifier 130e to make its prediction. The induction algorithm used to generate the classifiers 130e-130h in the second set may include parameters that take maximum score into consideration. Thus, in an embodiment the classifiers 130e-h include the ability to determine the maximum score from the inputs from non-corresponding classifiers. Also, a maximum score is a probability or another parameter representing a confidence or degree of confidence that a case belongs to a category.

In the examples described above, predictions are provided as probabilities. It will be apparent to one of ordinary skill in the art that the predictions may be binary, such as a prediction that a case belongs to a category or that the case does not belong to the category. Predictions may also be scores which represent a confidence or degree of confidence that a case belongs to a category. Also, the block diagram shown in FIG. 2 is generally illustrated as a circuit diagram for purposes of showing the data input into the classifiers 130a-g and the data output from the classifiers 130a-g. It will be apparent to one of ordinary skill in the art that the classifying system 128 shown in FIG. 1 including the classifiers 130a-g shown in FIG. 2 may be implemented in hardware, software or a combination thereof. Also, in FIG. 2, two sets of classifiers including four classifiers in each set are shown by way of example and not limitation. More or less classifiers may be included in each set depending on the classification needs.

In addition, the individual classifiers 130a-130g may be multi-class nominal or regressive, as is known in the art. Multi-class nominal includes a plurality of categories. In one example, the plurality of categories includes a hierarchy of categories. For example, the health category includes a dieting sub-category and a fitness sub-category. In this example, the classifiers 130a and 130e make predictions for the health, dieting, and fitness categories, which comprise a category hierarchy. The other classifiers may also be multi-class nominal or binary (e.g., one category being predicted by a classifier) or regressive. The output of the first set of classifiers 130a-130d may include a probability distribution for each of the categories, including probabilities for each sub-category in a category hierarchy. An induction algorithm used to generate the second set of classifiers 130e-130h may include known feature generation and/or feature selection parameters to determine whether predictions for sub-categories in one category hierarchy are relevant for predicting sub-categories in another category hierarchy. Also, categories predicted by one or more of the classifiers 130a-g may be regressive. For example, the regressive classifiers predicting a number, such as how heavy a person will be based on other input attributes such as their gender, age, and diabetic condition. Known regression algorithms may be used for predictions.

Figure 3:
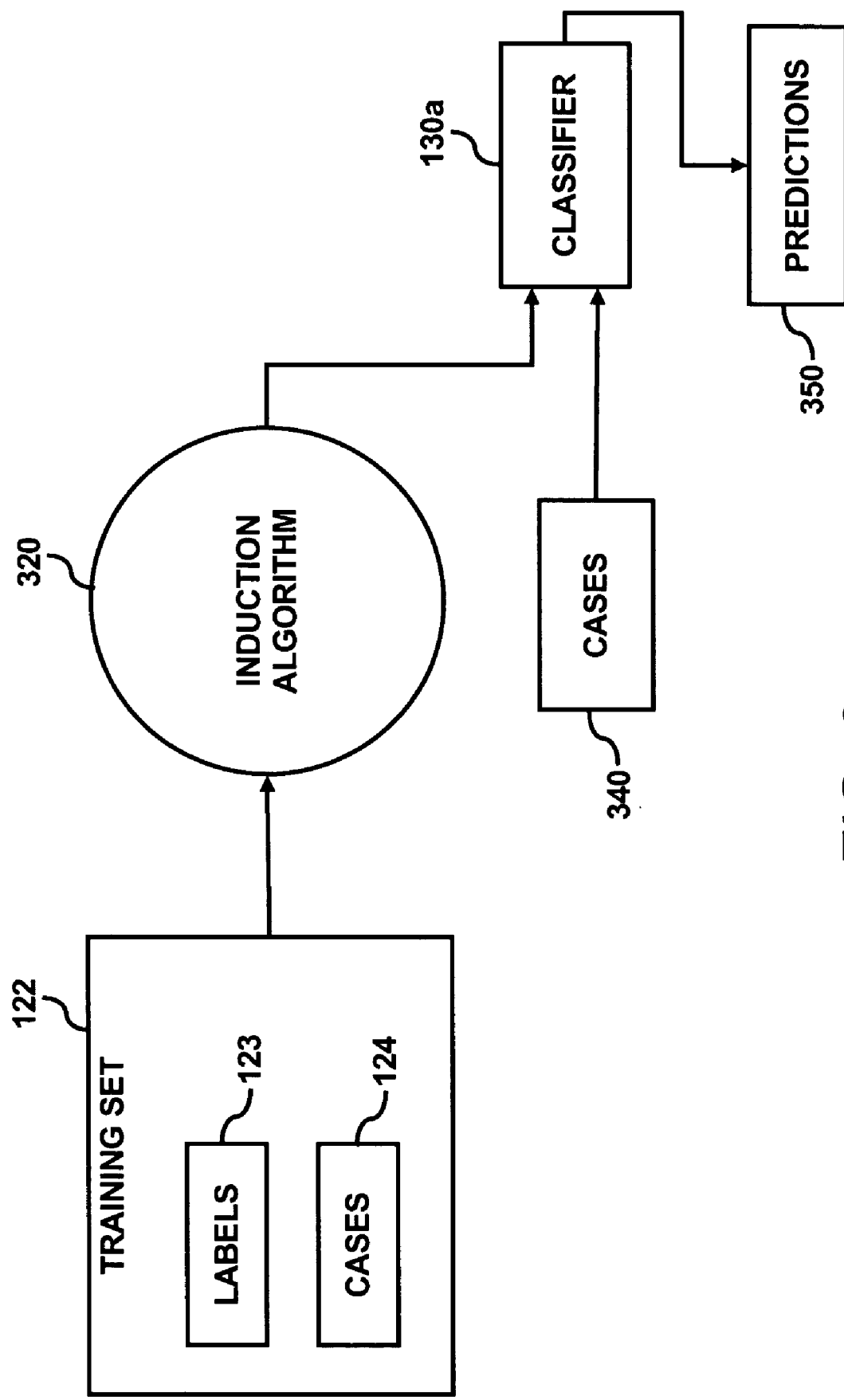
FIG. 3 illustrates using an induction algorithm to generate a classifier, according to an embodiment.

FIG. 3 illustrates using an induction algorithm to generate a classifier, according to an embodiment. As shown in FIG. 2, the training set 122 is used to train the classifiers 130a-h. FIG. 3 illustrates training one of the classifiers 130a and then using the classifier 130a to make predictions for cases. Although not shown, according to an embodiment an induction algorithm is also used to generate the classifiers 130b-h shown in FIG. 2.

FIG. 3 illustrates the training set 122, including the labels 123 and cases 124, an induction algorithm 320, the classifier 130a, cases 340, and predictions 350. The cases 124 include a set of documents for training the classifier 130a, and the labels 123 include a label for each document in the cases 124. For example, if a document in the cases 124 is a health document, then a label for the document from the labels 123 indicates that the document is a health document.

In the training phase, the training set 124 is input into the induction algorithm 320. The induction algorithm 320 may include a known induction algorithm, such as Naive Bayes, C4.5 decision trees, Support Vector Machines, and others. Running the induction algorithm 320 using the training set 122 as input generates a classifier, such as the classifier 130a, trained to classify documents in one or more categories, such as for example the health category. Then, the classifier 130a is used to classify cases without labels. For example, the classifier 130a is used to classify the cases 340. The classifier 130a generates the predictions 350, which includes a prediction for each document in the cases 340 of whether the document belongs to the health category for which the classifier 130a was trained. The predictions 350 for the classifier 130a are provided to the second set of classifiers 130e-h shown in FIG. 2, such that the second set of classifiers are operable to use the predictions 350 to make respective predictions. The predictions 350 are provided to the second set of classifier when the classifiers are training as well as after training.

Figure 4:
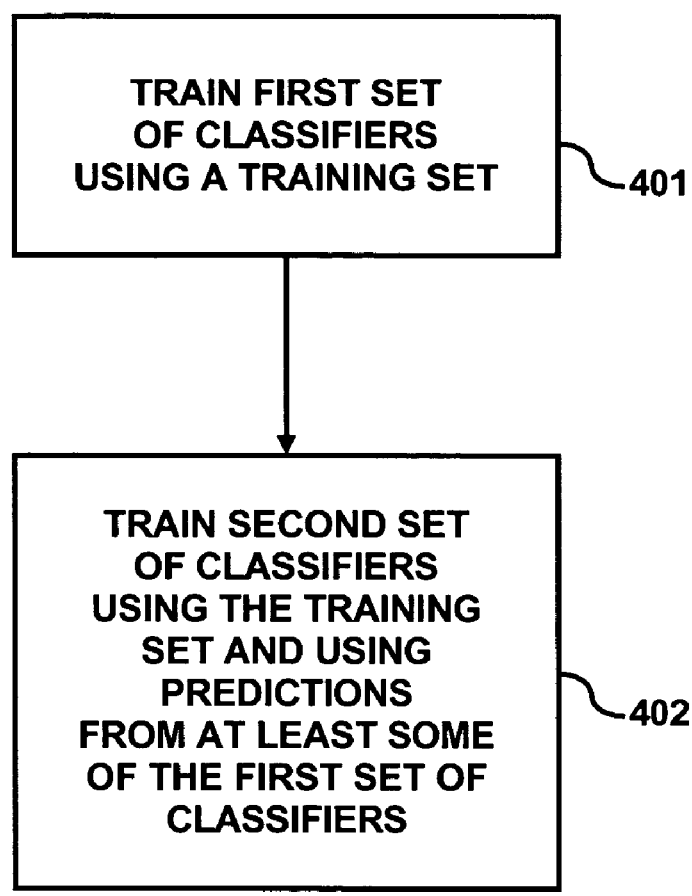
FIG. 4 illustrates a flow chart of a method for interdependent learning, according to an embodiment.

FIG. 4 illustrates a flow chart of a method 400 for machine learning, according to an embodiment. The method 400 is described with respect to FIGS. 1-3 by way of example and not limitation.

At step 401, the first set of classifiers 130a-d is trained using the training set 122. The training set 122 includes cases and labels for each case. The cases may be represented using a predetermined set of attributes.

At step 402, the second set of classifiers 130e-h is trained using the training set 122 together with additional attributes conveying the predictions from at least some of the first set of classifiers 130a-d. For example, the classifier 130e receives predictions from one or more of the non-corresponding classifiers 130b-d. These predictions along with the training set 122 are used for training the classifier 130e.

Modifications to the method 400 may be made as would be apparent to one of ordinary skill in the art. For example, steps 401 and 402 may be performed substantially simultaneously, or the predictions of the first set of classifiers that are needed for step 402 may be generated by known-manner cross-validation or leave-one-out methods. Also one or more classifiers in the second set may receive as input additional attributes conveying the predictions from one or more non-corresponding classifiers in the first set. These additional inputs are given both during the training phase, and later during actual use, when the labels are typically not available. During actual use, the first set of classifiers make their predictions and these outputs are fed to the second set of classifiers to make their final output predictions, such as the predictions 140 shown in FIG. 1.

Figure 5:
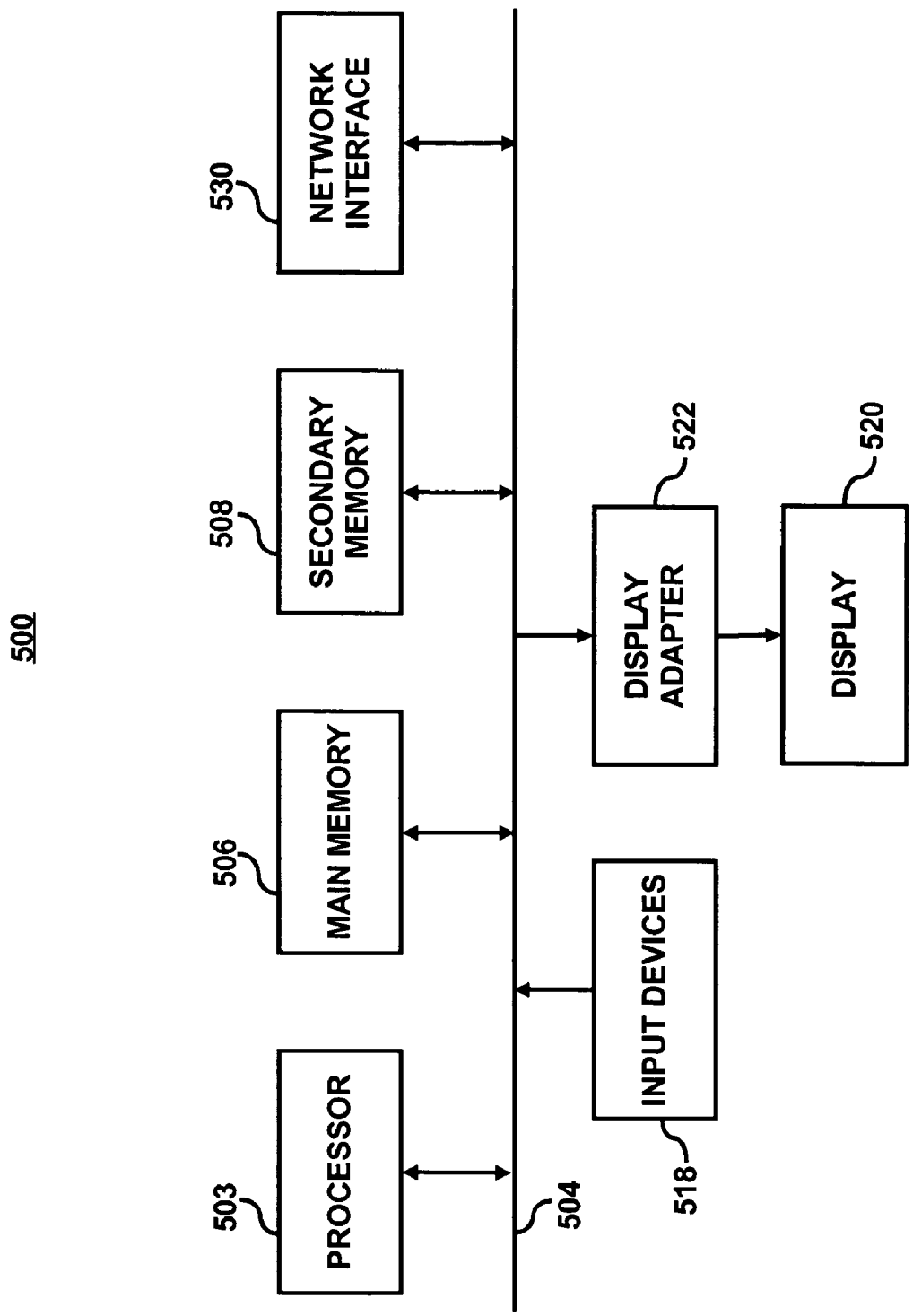
FIG. 5 illustrates a computer system, according to an embodiment.

FIG. 5 illustrates an example of a hardware platform for executing the classifiers 130a-130h shown in FIG. 2. The computer system 500 may be used as the hardware platform for the classifier system 128 shown in FIG. 1. The computer system 500 includes one or more processors, such as processor 503, providing an execution platform for executing software, such as classifiers and other modules. Commands and data from the processor 503 are communicated over a communication bus 504. The computer system 500 also includes a main memory 506, such as a Random Access Memory (RAM), where software may be resident during runtime, and a secondary memory 508. The secondary memory 508 includes, for example, a hard disk drive or other type of storage device. The secondary memory 508 may also include ROM (read only memory), EPROM (erasable, programmable ROM), EEPROM (electrically erasable, programmable ROM).

The computer system 500 may include user interfaces comprising one or more input devices 518, such as a keyboard, a mouse, a stylus, and the like. The display adapter 522 interfaces with the communication bus 504 and the display 520 and receives display data from the processor 503 and converts the display data into display commands for the display 530. The input devices 518, the display 520, and the display adapter 522 are optional. A network interface 530 is provided for communicating with other computer systems. It will be apparent to one of ordinary skill in the art that the computer system 500 more or less features depending on the complexity of system needed for running the classifiers.

The steps of the method 400 may be implemented as software embedded on a computer readable medium, such as the memory 506 and/or 508, and executed on the computer system 500, for example, by the processor 503.

The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of machine learning comprises:

training a first set of classifiers to predict a plurality of categories using attributes of training cases, wherein the training cases include documents, payroll data, web surfing data, user profiles, or any combination thereof; and training a second set of classifiers to predict the plurality of categories using the attributes of the training cases and using predictions from one or more of the classifiers in the first set as inputs for training the second set of classifiers, wherein the $i^{th}$ output of the first set classifiers does not input to the $i^{th}$ input of the second set classifiers;

receiving new cases for classification, wherein the new cases include one of new documents, new payroll data, new web surfing data, and new user profiles; and classifying the new cases into the plurality of categories with the trained first and second set of classifiers so as to classify each of the new cases under at least one topic as represented by one of the plurality of categories to organize the new cases.

2. The method of claim 1, wherein training a second set of classifiers further comprises:

determining a maximum score from the predictions of some classifiers in the first set; and using the maximum score as input to at least one classifier in the second set.

3. The method of claim 1, wherein classifying the new cases comprises:

first classifying the new cases with the trained first set of classifiers to make a first prediction of a classification of the new cases into the plurality of categories using attributes of the new cases;

second classifying the new cases with the trained second set of classifiers to make a second prediction of classification of the new cases into the plurality of categories using the first prediction and the attributes of the new cases as inputs to the trained second set of classifiers; and using the second prediction to classify the new cases into the plurality of categories.

4. The method of claim 1, wherein the predictions from one or more of the classifiers in the first set comprise at least one of scores, probabilities, and binary predictions.

5. The method of claim 1, wherein at least one of the plurality of categories is multi-class nominal.

6. The method of claim 5, wherein the at least one multi-class nominal category comprises a hierarchy of categories.

7. The method of claim 1, wherein at least one of the plurality of categories is regressive.

8. The method of claim 1, wherein, each classifier in the second set corresponds to a classifier in the first set such that a classifier in the second set generates predictions for the same category as a corresponding classifier in the first set.

9. The method of claim 8, wherein training a second set of classifiers further comprises:
using at least one of the predictions of respective non-corresponding classifiers of the first set as input for a classifier in the second set.

10. A method of classifying a case comprising:
applying the case to each classifier of a first set of classifiers operable to generate predictions for categories, wherein the case includes one document, payroll data, web surfing data, and user profiles;
applying the case to each classifier of a second set of classifiers also operable to generate predictions for the categories;
applying outputs of a plurality of classifiers in the first set of classifiers to one or more classifiers in the second set of classifiers wherein the $i^{th}$ output of the first set classifiers does not input to the $i^{th}$ input of the second set classifiers;
determining a category in which the case belongs based on the output of at least one of the second set of classifiers so as to classify the case under at least one of the categories to organize the case.

11. The method of claim 10, further comprising:
determining a maximum score from the predictions of some classifiers in the first set; and
using the maximum score as input to at least one classifier in the second set.

12. The method of claim 10, wherein determining a category in which the case belongs based on the output of at least one of the second set of classifiers further comprises:
determining a category in which the case belongs based on the maximum score.

13. The method of claim 10, wherein the outputs of the first set of classifiers comprise at least one of binary predictions, probabilities, and scores.

14. An apparatus comprising:
a plurality of classifiers in a first set, each classifier being operable to predict a category;
a plurality of classifiers in a second set, each classifier in the second set corresponding to a classifier in the first set such that a classifier in the second set predicts the same category as a corresponding classifier in the first set;
a training set input into the first set of classifiers, wherein the training set includes attributes of cases and labels; and
each classifier in the second set receiving predictions from at least some of non-corresponding classifiers in the first set such that each classifier in the second set is trained using the predictions from the at least some of the non-corresponding classifiers and the training set wherein the $i^{th}$ output of the first set classifiers does not input to the $i^{th}$ input of the second set classifiers;
wherein the apparatus operates to classify documents, payroll data, web surfing data, user profiles, or any combination thereof, under different categories based on predictions provided by the first and second set of classifiers for classifying the documents, payroll data, web surfing data, user profiles, or any combination thereof.

15. The apparatus of claim 14, wherein at least one classifier in the second set is further operable to use a maximum score for training, wherein the maximum score is determined from the predictions of the at least some of the non-corresponding classifiers.

16. An apparatus comprising:
a first set of classifier means for predicting a plurality of categories;
a second set of classifier means for predicting the plurality of categories, wherein the first set of classifier means and the second set of classifier means receive a same set of cases to predict, and the second set of classifier means also receives predictions from at least some of the first set of classifier means generating predictions for the set of cases wherein the $i^{th}$ output of the first set classifiers does not input to the $i^{th}$ input of the second set classifiers;
wherein the cases include documents, payroll data, web surfing data, user profiles, or any combination thereof, and the prediction of the plurality of categories by the second set of classifier means provide classification of each of the cases under one of the plurality of categories.

17. The apparatus of claim 16, wherein the second set of classifier means comprises a plurality of classifier means for predicting the plurality of categories, and at least one of the plurality of classifier means is operable to generate a prediction for each case of the set of cases.

18. The apparatus of claim 17, wherein the at least one of the plurality of classifiers uses a maximum score to generate the prediction, wherein the maximum score is based on predictions from at least some classifier means in the first set of classifier means.

19. A computer program provided on a computer readable medium and comprising code that when executed causes a computer to perform the following;
training a first set of classifiers to predict a plurality of categories using attributes of training cases, wherein the training cases include documents, payroll data, web surfing data, user profiles, or any combination thereof; and
training a second set of classifiers to predict the plurality of categories using the attributes of the training cases and using the predictions from one or more of the classifiers in the first set as inputs for training the second set of classifiers wherein the $i^{th}$ output of the first set classifiers does not input to the $i^{th}$ input of the second set classifiers;
receiving new cases for classification, wherein the new cases include one of the new documents, new payroll data, new web surfing data, and new user profiles; and
classifying the new cases into the plurality of categories with the trained first set and second set of classifiers so as to classify each of the new cases under at least one topic as represented by one of the plurality of categories.

20. The computer program of claim 19, wherein the code when executed further causes the computer to perform the following:
determining a maximum score from the predictions of some classifiers in the first set; and
using the maximum score as input to at least one classifier in the second set.

* * * * *

UNITED STATES PATENT AND TRADEMARK OFFICE
CERTIFICATE OF CORRECTION

PATENT NO.         : 7,406,452 B2
APPLICATION NO.    : 11/083320
DATED              : July 29, 2008
INVENTOR(S)        : George Henry Forman et al.

It is certified that error appears in the above-identified patent and that said Letters Patent is hereby corrected as shown below:

In column 7, line 12, in Claim 8, delete "wherein," and insert -- wherein --, therefor.

Signed and Sealed this

Nineteenth Day of May, 2009

JOHN DOLL
*Acting Director of the United States Patent and Trademark Office*